United States Patent
Chu et al.

(10) Patent No.: US 7,952,825 B2
(45) Date of Patent: May 31, 2011

(54) METHOD AND APPARATUS ADJUSTING REFERENCE CLOCK FREQUENCY AND DISK DRIVE USING SAME

(75) Inventors: Sang-hoon Chu, Yongin-si (KR); Cheol-hoon Park, Yongin-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 728 days.

(21) Appl. No.: 11/781,382

(22) Filed: Jul. 23, 2007

(65) Prior Publication Data
US 2008/0019031 A1    Jan. 24, 2008

(30) Foreign Application Priority Data
Jul. 24, 2006  (KR) .................. 10-2006-0069268

(51) Int. Cl.
*G11B 5/09* (2006.01)
(52) U.S. Cl. ................................................. 360/51
(58) Field of Classification Search .......... None
See application file for complete search history.

(56) References Cited

U.S. PATENT DOCUMENTS

| | | | |
|---|---|---|---|
| 5,128,809 A | 7/1992 | Leis et al. | |
| 5,535,067 A | 7/1996 | Rooke | |
| 5,724,204 A | 3/1998 | Shinohara et al. | |
| 5,903,410 A | 5/1999 | Blaum et al. | |
| 2007/0081266 A1* | 4/2007 | Buch et al. ........... | 360/51 |

* cited by examiner

*Primary Examiner* — Daniell L Negrón
(74) *Attorney, Agent, or Firm* — Volentine & Whitt, PLLC

(57) ABSTRACT

Provided is an apparatus and method of adjusting reference clock frequency in a disk drive. The reference clock frequency adjustment method includes; measuring each servo sector detection time interval, generating an error signal by subtracting initially set reference time interval information between servo sectors from the measured servo sector detection time interval information, and adjusting the reference clock frequency using the error signal such that a constant number of reference clock pulses are generated in each servo sector detection time interval regardless of variation in each servo sector detection time interval.

17 Claims, 6 Drawing Sheets

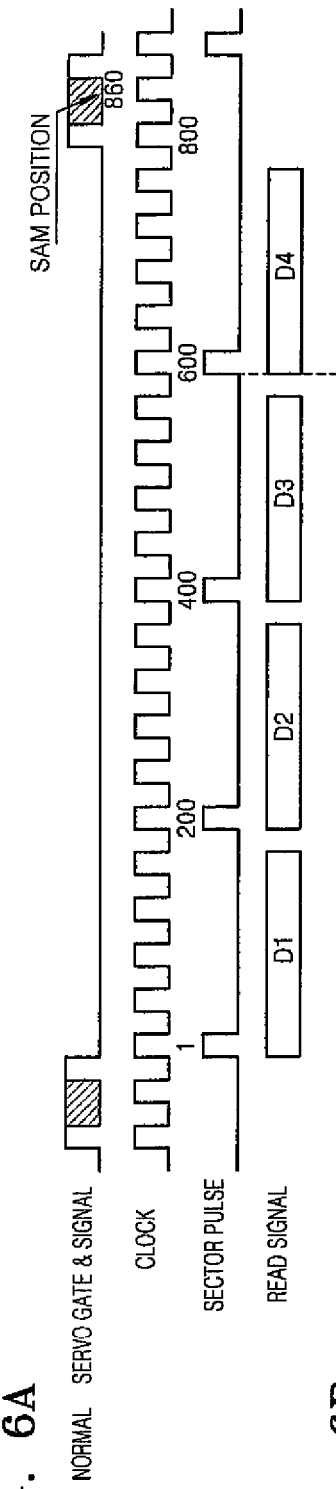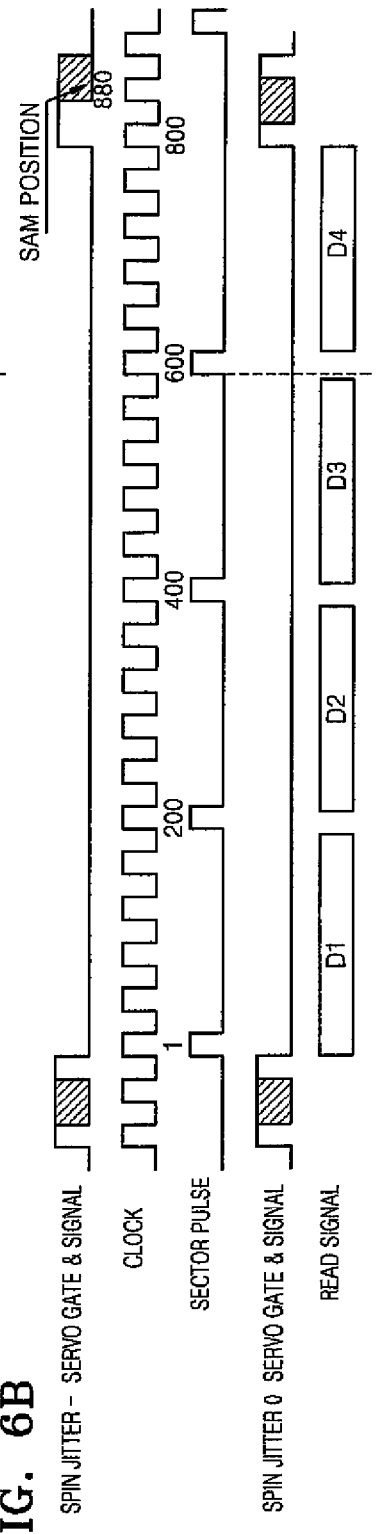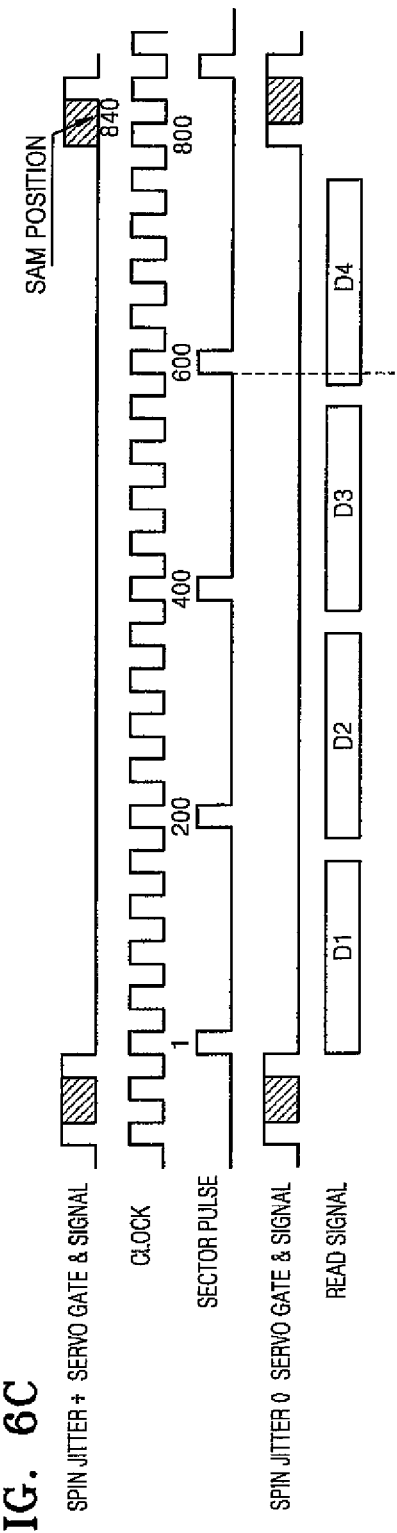

METHOD AND APPARATUS ADJUSTING REFERENCE CLOCK FREQUENCY AND DISK DRIVE USING SAME

BACKGROUND OF THE INVENTION

1. Field of the Invention

The present invention relates to a clock generation apparatus and method. More particularly, the invention relates to an apparatus and method adjusting the frequency of a reference clock adapted for use in a hard disk drive.

This application claims the benefit of Korean Patent Application No. 10-2006-0069268, filed on Jul. 24, 2006, in the Korean Intellectual Property Office, the disclosure of which is incorporated herein in its entirety by reference.

2. Description of the Related Art

Hard disk drives (HDDs) have been used for many years as convenient and economical data storage devices. In general, an HDD records data on a disk and subsequently reproduces the data using one or more magnetic head(s). Current design and manufacturing trends often seek to miniaturize HDDs while maintaining (or increasing) data storage capacity. Such trends lead to smaller HDDs characterized by higher data storage capacity and greater data recording density. Greater data density results in an increased number of bits per inch (BPI) being recorded on ever more densely packed data tracks on a disk, (i.e., both radial and track-linear recording densities are increased). Such changes, however, require very fine positioning control for the magnetic head relative to the very densely recorded data in contemporary HDDs.

Conventional HDDs perform read and write operations by determining the position of a data sector in relation to servo information obtained at a constant time interval from the rotating disk. This data sector data is read by at a constant speed by a transducer. In an ideal case, a constant number of clock pulses will be generated by constituent HDD circuitry regardless of the specific sector data being read.

Unfortunately, the ideal case is seldom realized. Various eccentricities, external vibrations, and non-uniformity in the recorded servo sector intervals generated during the servo data write process result in a variable clock frequency being obtained from different data sectors. That is, the time interval of certain clock pulses generated in relation to sector data is different for different data sectors. This result adversely affects servo control and magnetic head positioning within the HDD and the reliability of write/read operations suffers accordingly.

This problem has been previously recognized. Indeed, embodiments of the invention may be better understood in a background context provided by Korean Patent Application No. 10-2005-0112779 and U.S. Pat. No. 5,724,204, the collective subject matter of which is hereby incorporated by reference. For example, Korean Patent Application No. 10-2005-0112779 discloses one technique for correcting the timing of a servo gate pulse according to a spindle jitter value, where spindle jitter is detected in a disk drive. U.S. Pat. No. 5,724,204 discloses one technique for preventing a sync signal detection error due to a detected defect in the disk.

SUMMARY OF THE INVENTION

Embodiments of the invention provide a reference clock frequency adjustment apparatus and method adjusting the frequency of a reference pulse in relation to variation in the length of a servo sector detection period between servo sectors. Embodiments of the invention also provide a hard disk drive (HDD) incorporating same, as well as computer readable recording medium storing a computer readable program adapted to implement the reference clock frequency adjustment method.

In one embodiment, the invention provides a reference clock frequency adjustment method comprising; measuring each servo sector detection time interval, generating an error signal by subtracting initially set reference time interval information between servo sectors from the measured servo sector detection time interval information, and adjusting the reference clock frequency using the error signal such that a constant number of reference clock pulses are generated in each servo sector detection time interval regardless of variation in each servo sector detection time interval.

In another embodiment, the invention provides computer readable recording medium storing an executable program implementing the foregoing reference clock frequency adjustment method.

In another embodiment, the invention provides a reference clock frequency adjustment apparatus comprising; a counter measuring a servo sector detection time interval, a servo sector detection period variation detector generating an error signal by subtracting initially set reference time interval information between servo sectors from the servo sector detection time interval information measured by the counter, a frequency correction amount determiner determining a frequency correction amount for the reference clock in accordance with the error signal, and a variable clock generator varying the reference clock frequency in accordance with the frequency correction amount such that a constant number of reference clock pulses are generated in each servo sector detection time interval regardless of variation in each servo sector detection time interval.

In another embodiment, the invention provides a disk drive comprising; a disk storing information, a read/write head reading data from and recording data to the disk, and a controller calculating a variation of a servo sector detection time interval from the disk and adjusting a reference clock frequency in accordance with the calculated servo sector detection time interval variation such that a constant number of reference clock pulses are generated in each servo sector detection time interval regardless of a variation of each servo sector detection time interval.

BRIEF DESCRIPTION OF THE DRAWINGS

FIGS. 6A through 6C are timing diagrams of a servo gate pulse and a sector pulse in each of the SAM detection periods illustrated in FIG. 5 before a reference clock is adjusted;

DESCRIPTION OF EMBODIMENTS

The so-called head disk assembly (HDA) is the operational heart of hard disk drives (HDDs). It includes both mechanical and electrical components. FIG. (FIG.) 1 is an illustration of an exemplary HDA configuration susceptible to the benefits of the present invention.

Figure 1:
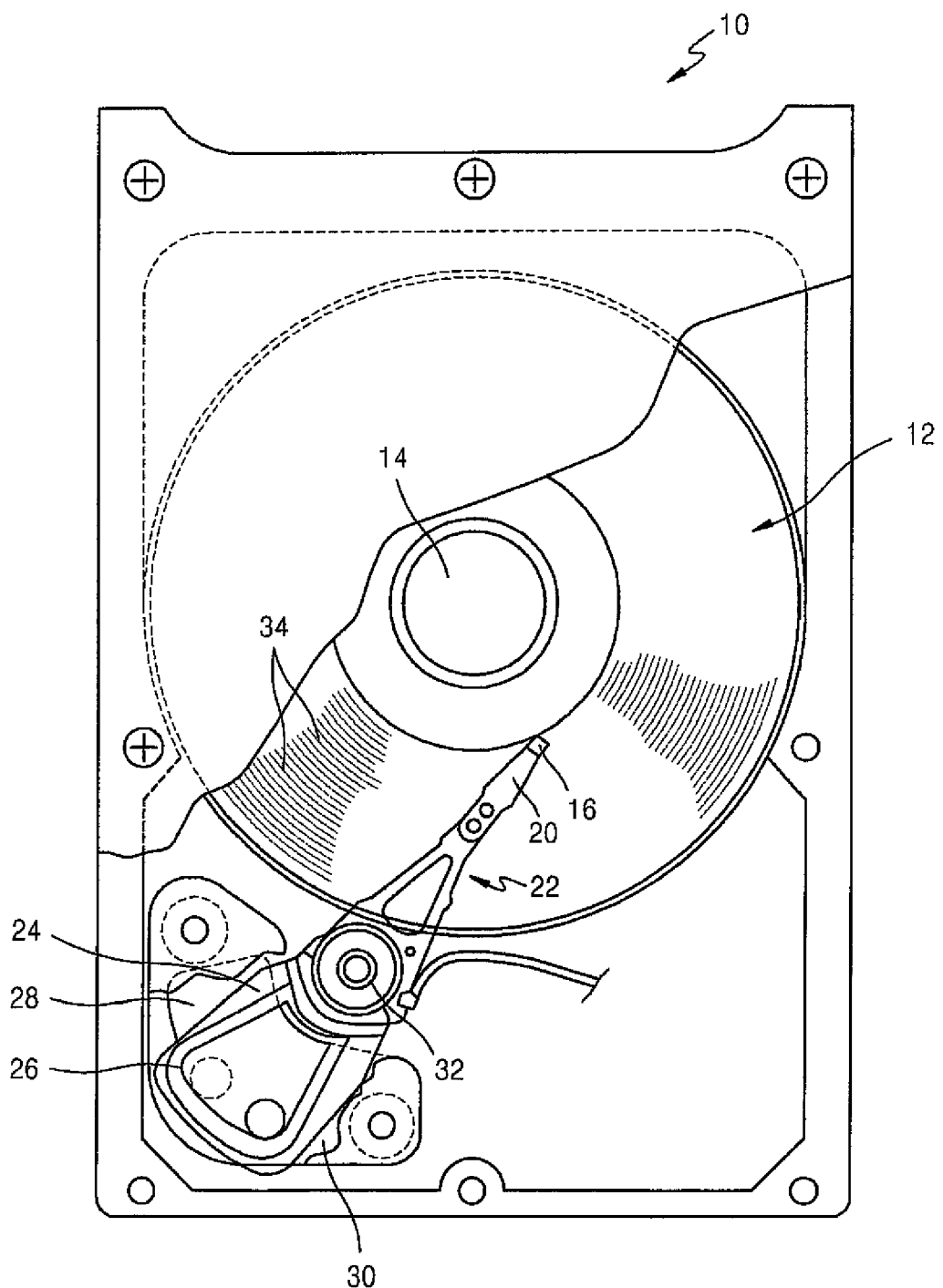
FIG. 1 is a schematic plan view of a head disk assembly (HDA) of an HDD to which the present invention is applied.

Referring to FIG. 1, HDA 10 includes at least one magnetic disk 12 rotated by a spindle motor 14. HDA 10 also includes a read/write head (e.g., a transducer) 16 adapted to float in close proximity over the surface of magnetic disk 12.

Read/write head 16 read data from disk 12 in relation to a magnetic field. Similarly, read/write head 16 writes data to disk 12 by selectively magnetizing the surface of disk 12. The read/write head may include common or separate read head and write head portions (e.g., separate transducer components). The read head portion may be formed from a magneto-resistive (MR) component.

In the illustrated example, read/write head 16 is mounted on a slider 20. Slider 20 is configured to generate an air cushion or bearing between read/write head 16 and disk 12. Slider 20 is connected to a head gimbal assembly (HGA) 22. In turn, HGA 22 is attached to an actuator arm 24 coupled to a voice coil 26. Voice coil 26 is operatively located next to a magnetic assembly 28 to define a voice coil motor (VCM) 30. An electrical current supplied to voice coil 26 generates a mechanical torque that rotates actuator arm 24 around a bearing assembly 32. The rotation of actuator arm 24 moves read/write head 16 over the surface of disk 12.

Figure 2:
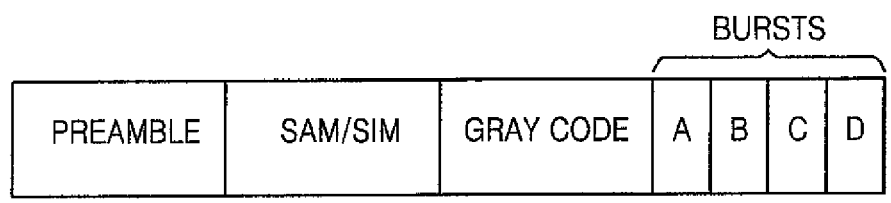
FIG. 2 illustrates a pattern of servo information recorded on a disk of a general HDD.

Data is typically recorded on disk 12 in defined concentric tracks 34. Each track is further divided into a plurality of sectors. Each sector is subdivided into a servo sector and a data sector. Servo signals (or servo data) are recorded in each servo sector. FIG. 2 is a conceptual diagram illustrating the data components associated with a typical set of servo signals.

For example, each servo sector may include a preamble, a servo address/index mark (SAM/SIM), a gray code, and burst signals A, B, C, and D. The preamble is provided to establish clock synchronization as well as a variable gain. The SAM indicates the beginning of the servo sector, and the SIM provides disk one-revolution information. The gray code provides identification (ID) information for each track, and the burst signals A, B, C, and D are used to control a read/write head positioning.

Figure 3:
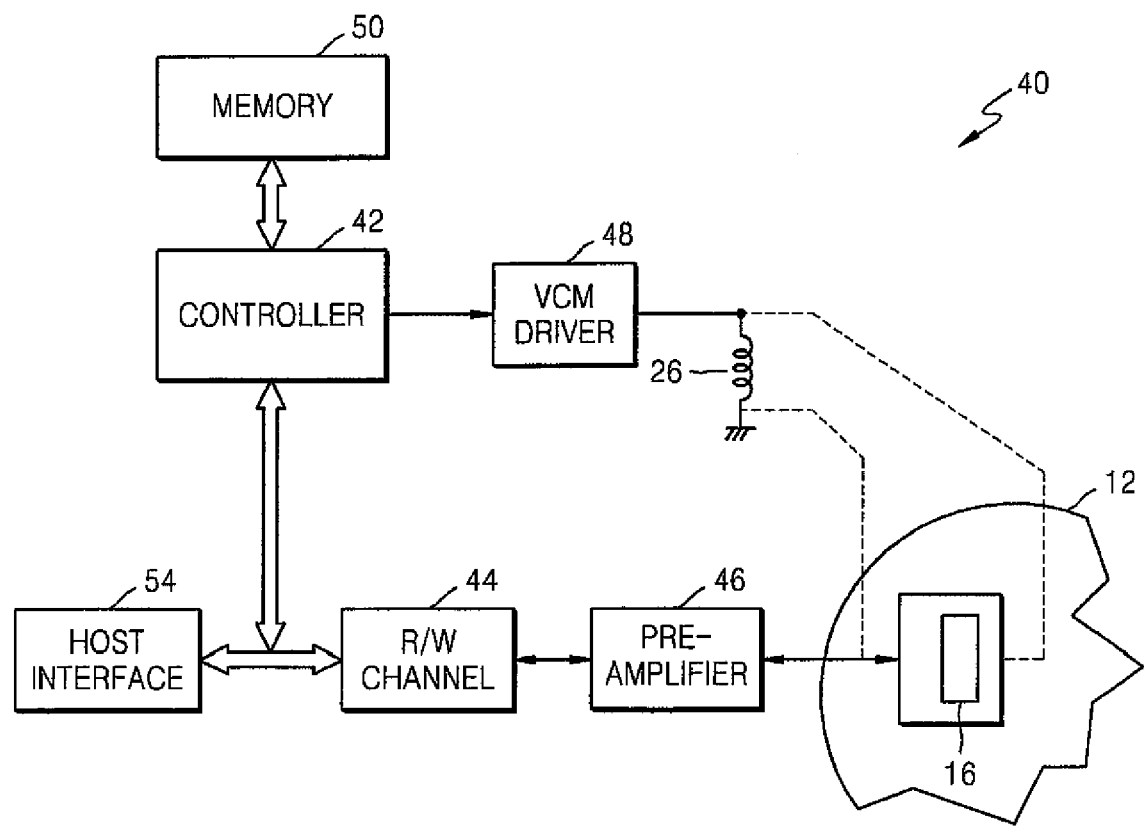
FIG. 3 is a block diagram of the electrical circuit configuration of a disk drive to which a reference clock frequency adjustment method and apparatus according to an embodiment of the present invention is applied.

FIG. 3 is a block diagram of an exemplary configuration of electrical circuits 40 implementing an HDD according to an embodiment of the present invention.

Referring to FIG. 3, electrical circuits 40 include, for example, a controller 42 connected to read/write head 16 via a write/read (R/W) channel circuit 44 and a pre-amplifier 46.

Controller 42 may be implemented as a digital signal processor (DSP), a microprocessor, or a micro-controller. Controller 42 controls the R/W channel circuit 44 during read operations in which data is read from disk 12 and during write operations in which data is recorded on disk 12. Controller 42 generates a sector pulse designating a proper position for read/write head 16 during each read or write operation. This sector pulse is generated in relation to a reference clock. Controller 42 also generates a servo gate pulse required to acquire a servo address mark signal.

Controller 42 and VCM driver 48 combine to supply a driving current to voice coil 26. Controller 42 supplies a control signal to VCM driver 48 that controls excitation of VCM 30 and, therefore the positioning of read/write head 16. A memory 50 associated with controller 42 may be used to store the executable software and related data necessary to control the HDD.

An exemplary operation of the illustrated HDD example will now be described.

During a read operation, the HDD amplifies an analog signal provided by read/write head 16 in response to a magnetic field detected from disk 12. This amplification function is performed by pre-amplifier 46. R/W channel circuit 44 then converts the analog signal into a corresponding digital data signal using timing characteristics defined by the read sector pulse generated by controller 42. The digital data signal is subsequently converted into a stream of data bits (1's and 0's), and transmitted to a host device (not shown) via a host interface 54.

During a write operation, the HDD receives data from the host device via host interface 54, and temporarily stores the received data in a buffer (not shown) associated with host interface 54. The data stored in the buffer is then converted into a binary data stream compatible with the write channel of disk 12 using R/W channel 44. This binary data stream is then recorded on disk 12 by operation of read/write head 16 in relation to a write current provided by pre-amplifier 46 in accordance with the write sector pulse.

In certain embodiments of the invention, controller 42 is assumed to include a circuit adapted to adjust the frequency of a reference clock. This reference clock is integral to the proper execution of the read/write operations in the HDD. One embodiment of this circuit is illustrated in block diagram of FIG. 4. An exemplary method for adjusting the reference clock frequency is summarized in the flowchart of FIG. 8. However, the clock adjustment circuit illustrated in FIG. 4 may alternately be provided outside controller 42.

An understanding of these exemplary embodiments will be better understood upon consideration of the following.

If the rotational speed of a disk in an HDD is constant, servo information will be detected at a constant rate (i.e., at intervals having a constant period). However, if the rotational speed of the disk varies due to some variation in the speed of attached spindle motor or due to some disturbance (e.g., slip) or eccentricity associated with the disk, then the detection rate of the servo information will also vary. This variance in the detection of servo information may cause a positioning error for the read/write head during a write operation (i.e., the position data associated with the "current" data sector may be erroneous).

In this regard, spindle jitter (i.e., "spin jitter") is a difference between the current rotational speed of a disk and it's intended (or "target") speed. If it is assumed that the disk contains no physical eccentricities, when the spindle jitter value is 0, a SAM will be detected at a constant rate, but when the spindle jitter value in non-0, the SAM detection period will vary from the desired constant rate.

Figure 5:
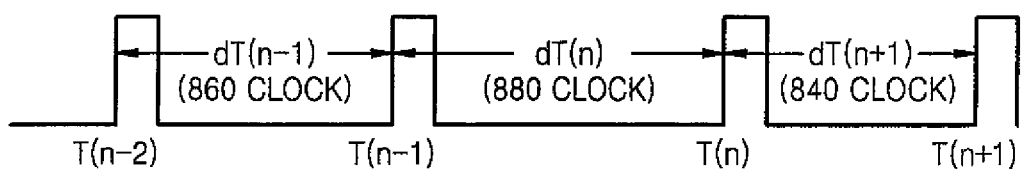
FIG. 5 illustrates time intervals between servo address mark (SAM) detection periods.

As illustrated in FIG. 5, if a standard or normal (i.e., specified by design) SAM detection period is 860 clock pulses, one servo sector detection time may be longer in a first period dT(n) having a SAM detection period of 880 clock pulses, but a second servo sector detection time may be shorter in a second period dT(n+1) having a SAM detection period of 840 clock pulses.

FIG. 6A further illustrates a sector pulse ideally matched to write/read position data and assumes that the data is to be read or recorded when the spindle jitter value is 0. That is, FIG. 6A shows in some additional detail the SAM detection and sector pulse generation timing associated with the initial period dT(n−1) of FIG. 5.

FIG. 6B further illustrates a data write sector pulse that is not matched to write position data and assumes that the data is written in a state where the spindle jitter value is a negative and where the data is read in a state where a value of spindle jitter is 0. That is, FIG. 6B shows in some additional detail the SAM detection and sector pulse generation timing associated with the first period dT(n) of FIG. 5.

FIG. 6C further illustrates a data read sector pulse that is not matched to write position data and assumes that the data is written in a state where the spindle jitter value is positive and where the data is read in a state where a value of spindle jitter is 0. That is, FIG. 6C shows in some additional detail the SAM detection and sector pulse generation timing associated with the second period dT(n+1) of FIG. 5.

In FIGS. 6B and 6C, since the servo gate pulse generation position does not match the SAM write position and a sector pulse generation position does not match the data write position, the possibility of an error exists in the constituent read/write operations.

Thus, in the example illustrated in FIGS. 6B and 6C, an adjustment to the servo gate pulse and sector pulse timing generation is required. In one embodiment of the invention, this may be accomplished using the circuit illustrated in FIG. 4.

Figure 4:
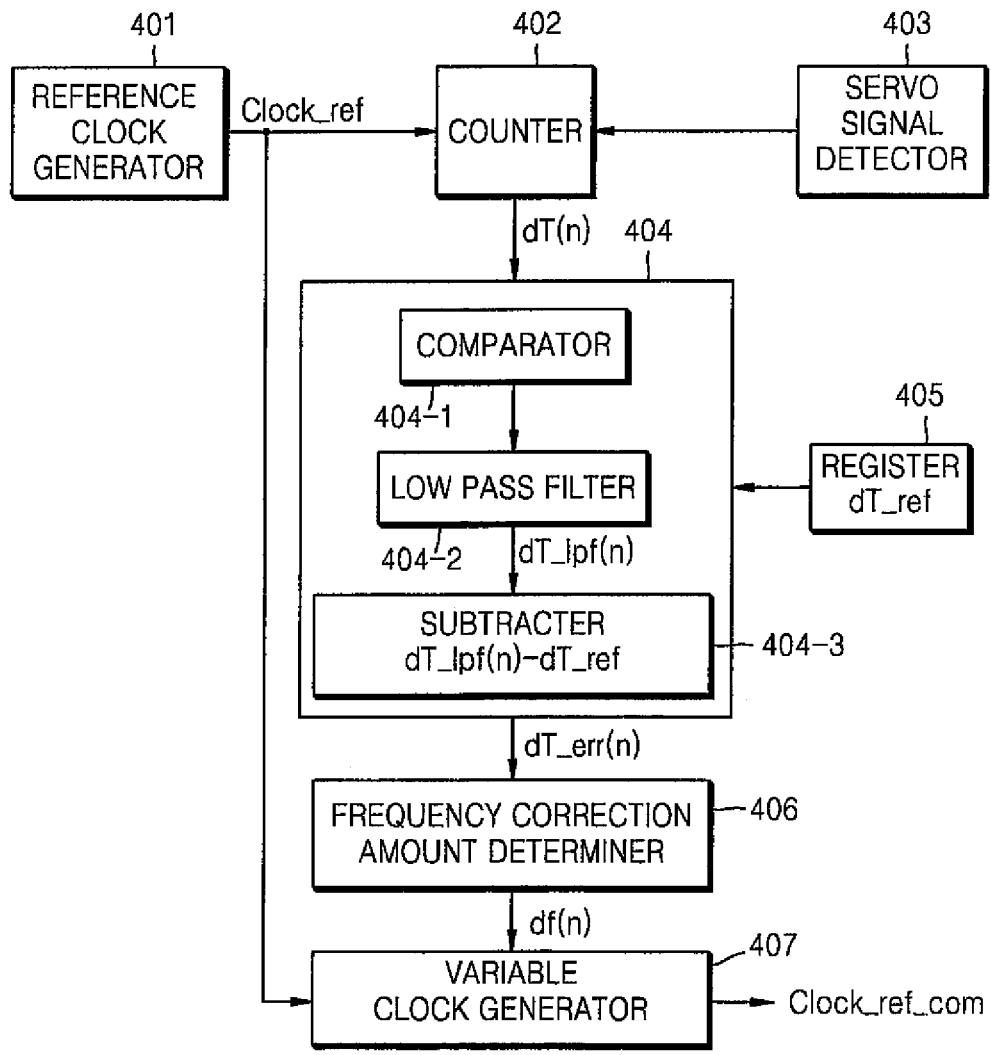
FIG. 4 is a block diagram of a reference clock frequency adjustment apparatus according to an embodiment of the present invention.

FIG. 4 is a block diagram of a reference clock frequency adjustment apparatus according to an embodiment of the present invention.

Referring to FIG. 4, the reference clock frequency adjustment apparatus includes a reference clock generator 401, a counter 402, a servo signal detector 403, a servo sector detection period variation detector 404, a register 405, a frequency correction amount determiner 406, and a variable clock generator 407.

Servo sector detection period variation detector 404 includes a comparator 404-1, a low pass filter 404-2, and a subtracter 404-3.

Reference clock generator 401 generates a reference clock Clock_ref having a defined frequency, which is used in a servo control or data read/write process. That is, reference clock generator 401 generates the reference clock Clock_ref having a fixed frequency, which is used in the servo control or data read/write process under conditions where a normal servo sector detection period is maintained. The frequency of the reference clock Clock_ref used during read/write operations is set differently for data being written to or read respective zones of the disk.

Servo signal detector 403 detects a servo signal recorded in a servo sector of the disk. In the illustrated embodiment of the invention, servo signal detector 403 detects, for example, the SAM from among the servo signals illustrated in FIG. 2.

Counter 402 is reset every time a SAM is detected by servo signal detector 403 and counts the number of reference clock Clock_ref pulses until a subsequent SAM is detected. That is, counter 402 generates detection time interval information dT(n) between (n−1)th and nth SAMS, wherein dT(n) denotes a length of a detection period of an nth servo sector.

Comparator 404-1 compares the value of the SAM detection time interval information dT(n), generated by counter 402, with a first threshold and outputs a value according to the comparison result. That is, if the value of dT(n) is greater than the first threshold, comparator 404-1 determines that a length of a servo sector detection period is not normal, replaces dT(n) input from counter 402 with reference time interval information dT_ref between servo sectors, which is stored in register 405, and outputs dT_ref to low pass filter 404-2.

Here, the first threshold corresponds to a limit value for determining whether a SAM is normally detected, and the value of dT(n) is greater than the first threshold when a SAM cannot be detected from a current servo sector due to a disk scratch or a recorded bad servo pattern. If the reference clock frequency is adjusted using dT(n) in a case where a SAM is not normally detected, the adjusted reference clock frequency will be wrong. In order to prevent this, if the value of dT(n) is greater than the first threshold, the input dT(n) information is replaced with the reference time interval information dT_ref between servo sectors, which is stored in register 405.

Comparator 404-1 outputs the input dT(n) information to low pass filter 404-2 if the value of dT(n) is equal to or less than the first threshold.

Low pass filter 404-2 removes high frequency noise included in the signal input from comparator 404-1. The frequency disturbance compensated in the illustrated embodiment of the invention may be a low frequency disturbance of (e.g.,) several hundreds Hz, and/or a high frequency disturbance occurring in dT(n) for an assumed measurement condition in which dT(n) is sampled in a rate of several KHz corresponding to noise. Thus, low pass filter 404-2 is designed to have a bandwidth ranging between several hundreds Hz and several KHz considering all kinds of disturbances affecting the SAM detection time interval, such as disk eccentricities and/or a change of a disk rotation speed.

A filtered signal dT_lpf (n) output from low pass filter 404-2 is applied to subtracter 404-3.

Subtracter 404-3 outputs an error signal dT_err(n) obtained by subtracting the reference time interval information dT_ref between servo sectors, which is initially set, from the detection time interval information dT_lpf(n) of the current servo sector.

Frequency correction amount determiner 406 determines a frequency correction amount df(n) of the reference clock Clock_ref according to the error signal dT_err(n) input from subtracter 404-3. That is, frequency correction amount determiner 406 determines the frequency correction amount df(n) by multiplying the error signal dT_err(n) by a proportional constant A. The proportional constant A is a factor for determining a reference clock frequency variation changed according to the magnitude of the error signal dT_err(n).

In the present invention, if an absolute value of the error signal dT_err(n) is greater than a second threshold, frequency correction amount determiner 406 replaces df(n) by a frequency correction amount df(n−1) determined based on an error signal dT_err(n−1) generated in a previous servo sector. That is, if the magnitude of the error signal dT_err(n) is relatively great, since it is determined that the error signal dT_err(n) cannot be reliable, the frequency correction amount df(n−1) determined based on the error signal dT_err(n−1) of a previous sample is used.

Frequency correction amount determiner 406 may be designed to delimit a frequency correction amount that can be changed at once. That is, frequency correction amount determiner 406 may be designed to limit a frequency correction range, which can be changed by the error signal dT_err(n), to a maximum frequency correction amount ±df(n)_sat.

Here, the frequency correction amount df(n) is limited to −df(n)_sat in a negative direction and to +df(n)_sat in a positive direction in order to delimit the frequency correction amount that can be changed at once.

Variable clock generator 407 varies the frequency of the reference clock Clock_ref using the determined frequency correction amount df(n) so that a constant number of reference clock pulses are generated in each servo sector detection time interval regardless of whether each servo sector detection time interval is changed and generates a varied reference clock Clock_ref_com. That is, the corrected reference clock Clock_ref_com is generated by subtracting the frequency correction amount df(n) from the frequency of the reference clock Clock_ref.

Thus, since a SAM detection time interval is longer than a SAM detection reference time interval in the dT(n) duration illustrated in FIG. 5, the reference clock frequency adjustment apparatus illustrated in FIG. 4 adjusts the reference clock frequency to decrease in accordance with variation in the SAM detection time interval. Additionally, since a SAM detection time interval is shorter than the SAM detection reference time interval in the dT(n+1) duration illustrated in FIG. 5, the reference clock frequency adjustment apparatus illustrated in FIG. 4 adjusts the reference clock frequency to be increase in accordance with variation in the SAM detection time interval. Thus, the reference clock frequency may be adjusted in accordance with the SAM detection time interval.

Figure 8:
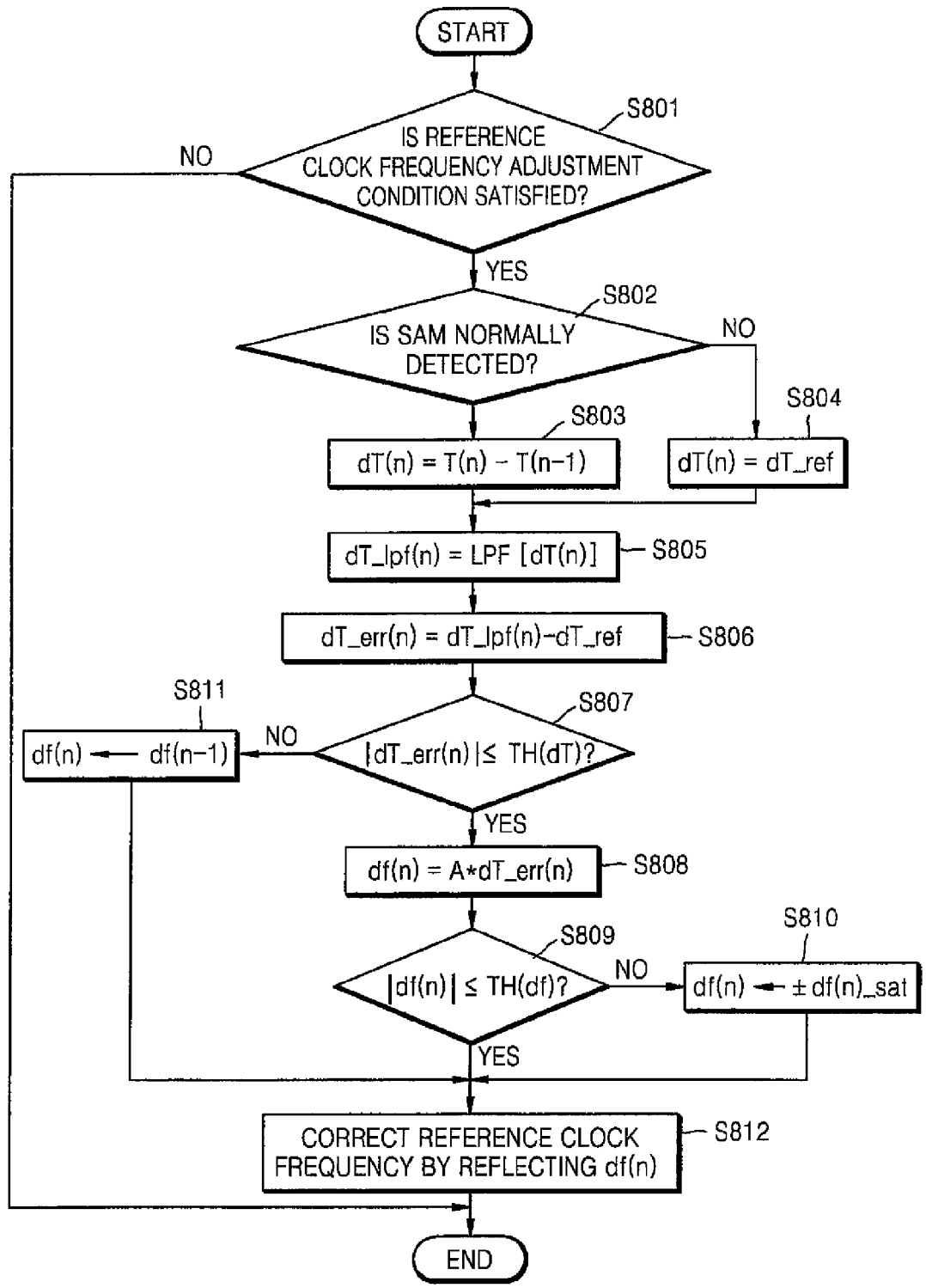
FIG. 8 is a flowchart illustrating a reference clock frequency adjustment method according to an embodiment of the present invention.

FIG. 8 is a flowchart summarizing a reference clock frequency adjustment method according to an embodiment of the invention.

Referring to FIG. 8, it is first determined whether a reference clock frequency adjustment condition is satisfied within the HDD (S801). The reference clock frequency adjustment condition corresponds to a servo signal access condition when a reference clock is used in the servo control process or to a read/write operation condition when the reference clock is used in a read/write operation.

If it is determined that the reference clock frequency adjustment condition is satisfied (S801=yes), it is next determined whether a SAM recorded in a servo sector is normally detected (S802). Whether the SAM is normally detected is determined by comparing SAM detection time interval information dT(n) to a first threshold. That is, if a value of dT(n) is greater than the first threshold, it is determined that the SAM is not normally detected, and if the value of dT(n) is equal to or less than the first threshold, it is determined that the SAM is normally detected.

Here, the first threshold corresponds to a limit value for determining whether a SAM is normally detected, and the value of dT(n) is greater than the first threshold when a SAM cannot be detected from a current servo sector due to (e.g.,) a disk scratch or a bad servo pattern.

If it is determined that the SAM is normally detected (S802=yes), servo sector detection time interval information is calculated (S803). The servo sector detection time interval information corresponds to the detection time interval information dT(n) between (n−1)th and nth SAMs. That is, dT(n)= T(n)−T(n−1), wherein T(n) denotes detection timing of an nth SAM, and T(n−1) denotes detection timing of an (n−1)th SAM.

If it is determined that the SAM is not normally detected (S802=no), dT(n) is replaced by initially set reference time interval information dT_ref between servo sectors (S804).

Next, low pass filtering of the dT(n) signal is performed (S805) in order to remove high frequency noise. As noted above the frequency disturbance compensated for in the illustrated embodiment may range in frequency from several hundred Hz to several KHz. Thus, a bandwidth of a low pass filter is designed with a range of between several hundreds Hz and several KHz considering all kinds of possible disturbances likely to affect a change in the SAM detection time interval.

Next, an error signal dT_err(n) is calculated by subtracting the initially set reference time interval information dT_ref between servo sectors from a low pass filtered signal dT_lpf(n) (S806).

It is then determined whether an absolute value of the error signal dT_err(n) is greater than a second threshold TH(dT) (S807).

If is determined that the absolute value of the error signal dT_err(n) is greater than the second threshold TH(dT) (S807=no), it is assumed that the error signal dT_err(n) generated in relation to the current servo sector is not reliable, and a frequency correction amount df(n) of the current servo sector is replaced by a frequency correction amount df(n−1) determined based on an error signal dT_err(n−1) generated in a previous servo sector (S811).

If is determined that the absolute value of the error signal dT_err(n) is equal to or less than the second threshold TH(dT) (S807=yes), the frequency correction amount df(n) of a reference clock Clock_ref is determined according to the input error signal dT_err(n) (S808). That is, the frequency correction amount df(n) is determined by multiplying the error signal dT_err(n) by a proportional constant A. The proportional constant A is a factor for determining a reference clock frequency variation changed according to the magnitude of the error signal dT_err(n).

Thus, it is determined whether an absolute value of the frequency correction amount df(n) is greater than a third threshold TH(df) (S809).

If it is determined that the absolute value of the frequency correction amount df(n) is greater than the third threshold TH(df) (S809=no), the frequency correction amount df(n) is set to a maximum frequency correction amount ±df(n)_sat (S810). That is, the frequency correction amount df(n) is limited to −df(n)_sat in a negative direction and to +df(n)_sat in a positive direction in order to delimit the frequency correction amount that can be changed at once.

A varied reference clock Clock_ref_com is generated by varying a frequency of the reference clock Clock_ref using the determined frequency correction amount df(n) so that a constant number of reference clock pulses are generated in each servo sector detection time interval regardless of whether each servo sector detection time interval is changed. That is, the corrected reference clock Clock_ref_com is generated by subtracting the frequency correction amount df(n) from the frequency of the reference clock Clock_ref Thus, the reference clock frequency may be adjusted in accordance with a variation in the detection period between servo sectors.

As illustrated in FIG. 5, it is assumed that a normal SAM detection period has 860 clock pulses, a SAM detection period in the dT(n) duration has 880 clock pulses, and a SAM detection period in the dT(n+1) duration has 840 clock pulses.

When a reference clock having a fixed frequency is used instead of using the reference clock frequency adjustment method according to an embodiment of the invention, SAM detection and sector pulses are generated according to the timing illustrated in FIGS. 6A through 6C. That is, in FIGS. 6B and 6C, a servo gate pulse generation position does not match a SAM write position, and a sector pulse generation position does not match a data write position.

Figure 7A:
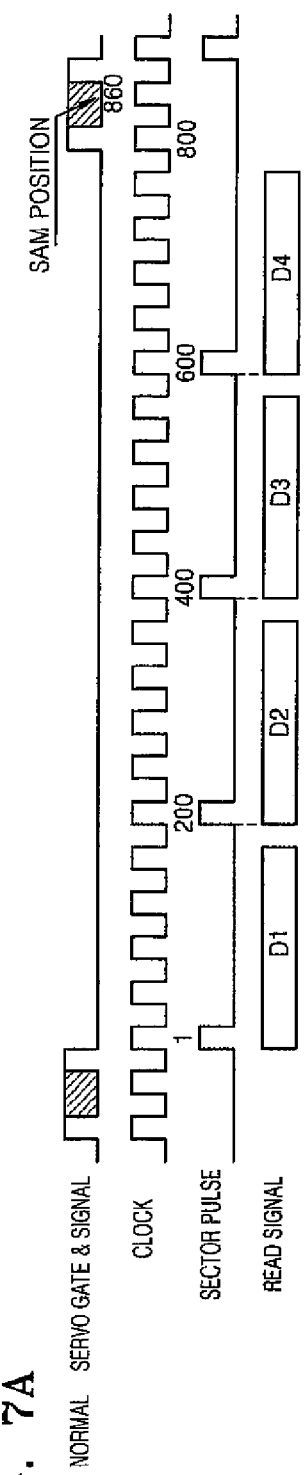
FIGS. 7A through 7C are timing diagrams of a servo gate pulse and a sector pulse in each of the SAM detection periods illustrated in FIG. 5 after the reference clock is adjusted according to an embodiment of the present invention.
Figure 7B:
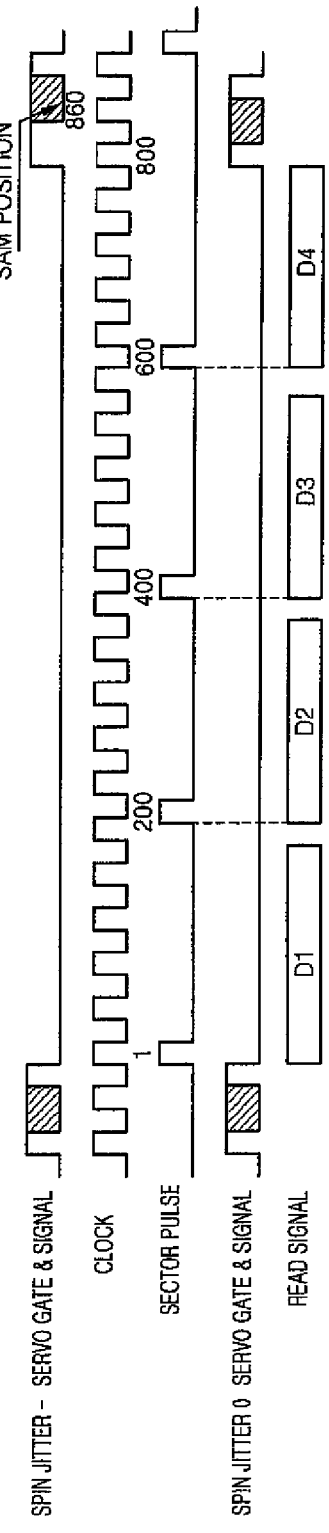
Figure 7C:
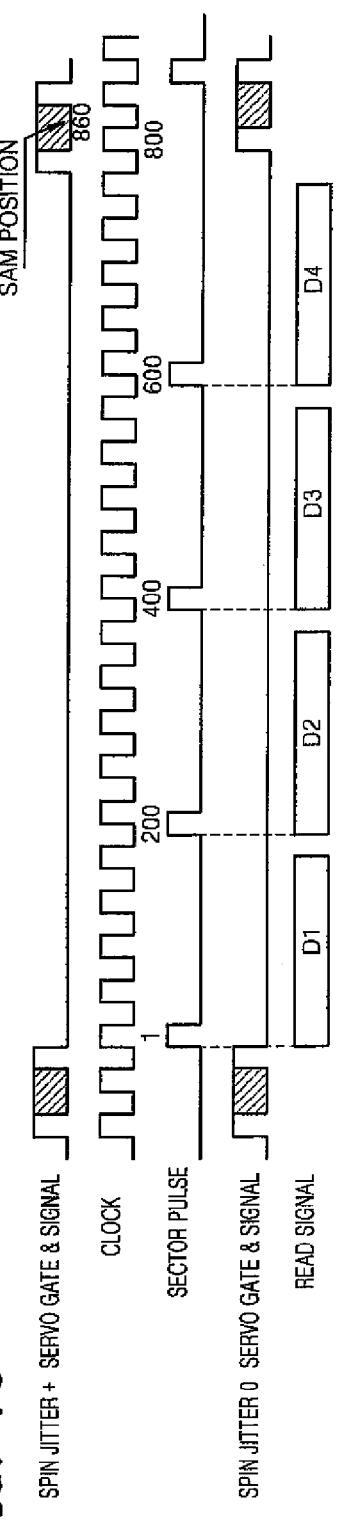

If the reference clock frequency adjustment method according to an embodiment of the invention is applied to the case of the SAM detection periods illustrated in FIG. 5, SAM detection and sector pulses are generated according to the timing illustrated in FIGS. 7A through 7C. FIG. 7A is a timing diagram of the period dT(n−1) shown in FIG. 5. FIG.

7B is a timing diagram in the period dT(n) shown in FIG. 5, and FIG. 7C is a timing diagram in the period dT(n+1) shown in FIG. 5.

Since a correct SAM detection time interval is obtained in the dT(n−1) duration of FIG. 5, the reference clock frequency is not adjusted, and in this case, as illustrated in FIG. 7A, a servo gate pulse is correctly generated in a SAM write position, and a sector pulse is correctly generated in a beginning position of a data sector.

Since a SAM detection period in the dT(n) duration of FIG. 5 is longer than the previous SAM detection period, the reference clock frequency is decreased in accordance with the variation of the SAM detection time interval. Thus, since a servo gate pulse generation position and a sector pulse generation position are relatively late as compared to FIG. 7A, as illustrated in FIG. 7B, a servo gate pulse is correctly generated in a SAM write position, and a sector pulse is correctly generated in a beginning position of a data sector.

Since a SAM detection period in the dT(n+1) duration of FIG. 5 is shorter than the previous SAM detection period, the reference clock frequency is increased in accordance with the variation of the SAM detection time interval. Thus, since a servo gate pulse generation position and a sector pulse generation position are relatively early as compared to FIG. 7A, as illustrated in FIG. 7C, a servo gate pulse is correctly generated in a SAM write position, and a sector pulse is correctly generated in a beginning position of a data sector.

In FIG. 5, it is assumed for convenience of description that a spindle jitter value in the dT(n−1) duration is 0, a spindle jitter value in the dT(n) duration has a negative value, and a spindle jitter value in the dT(n+1) duration has a positive value. However, in reality, if one sector has a negative spindle jitter value, a number of continuous sectors having a negative spindle jitter value are likely. Similarly, if one sector has a positive spindle jitter value, a number of continuous sectors having a positive spindle jitter value are also likely.

Embodiments of the invention may be realized as a method, an apparatus, and/or a system. When an embodiment of the invention is realized as software, components may be implemented as executable code segments. A program or related code segments may be stored in memory (or readable recording medium) associated with a processor. Alternately or additionally, the program or related code segments may be transmitted as computer data signals combined with a carrier using a transmission medium or a communication network. The processor readable recording medium is any data storage device that can store or transmit data which can be thereafter read by a computer system. Examples of the processor readable recording medium include electronic circuits, semiconductor memory devices, read-only memory (ROM), flash memory, erasable ROM, floppy disks, optical discs, hard discs, optical fiber media, and RF networks. The computer data signals include any signal which can be propagated via transmission media such as electronic network channels, optical fibers, air, electronic fields, RF networks.

The present invention can be applied to various kinds of disk drives including HDDs.

As described above, according to an embodiment of the invention, by adaptively varying a frequency of a reference clock in accordance with a variation in a detection period between servo sectors, even if the time interval between data sectors is changed due to disk eccentricity, external vibration, non-uniformity of a servo sector interval generated in a servo write process, a decrease of servo control performance can be prevented, and a decrease of data read/write reliability can also be prevented.

In addition, even if a servo signal cannot be normally detected due to a disk scratch, the reference clock frequency can be stably corrected. In addition, by saturating a frequency variation within a predetermined range, the reference clock frequency can be stably corrected.

While the present invention has been particularly shown and described with reference to exemplary embodiments thereof, it will be understood by those of ordinary skill in the art that various changes in form and detail may be made therein without departing from the scope of the invention as defined by the following claims.

What is claimed is:

1. A reference clock frequency adjustment method comprising:
   (a) measuring each servo sector detection time interval by determining whether a servo address mark (SAM) is normally detected, and
   if the SAM is normally detected, calculating detection time interval information for a current servo sector by measuring a time interval between a previous SAM detection to the current SAM detection, but
   if the SAM is not normally detected, determining the detection time interval information for the current servo sector as reference time interval information between servo sectors;
   (b) generating an error signal by subtracting initially set reference time interval information between servo sectors from the measured servo sector detection time interval information; and
   (c) adjusting the reference clock frequency using the error signal such that a constant number of reference clock pulses are generated in each servo sector detection time interval regardless of variation in each servo sector detection time interval.

2. The reference clock frequency adjustment method of claim 1, wherein (c) comprises:
   if the error signal has a positive value, decreasing the reference clock frequency, but if the error signal has a negative value, increasing the reference clock frequency.

3. The reference clock frequency adjustment method of claim 1, wherein the servo sector detection time interval information is calculated by measuring a time interval in which a servo address mark (SAM) is detected.

4. The reference clock frequency adjustment method of claim 1, wherein the reference clock comprises a reference clock used for servo control.

5. The reference clock frequency adjustment method of claim 1, wherein the reference clock comprises a reference clock used during read or write operations.

6. The reference clock frequency adjustment method of claim 1, further comprising:
   performing low pass filtering to remove noise included in a signal indicating the detection time interval information for the current servo sector.

7. The reference clock frequency adjustment method of claim 1, wherein (c) comprises:
   if an absolute value of the error signal is equal to or less than a second threshold, adjusting the reference clock frequency using an error signal calculated in a current servo sector; but
   if the absolute value of the error signal is greater than the second threshold, adjusting the reference clock frequency using an error signal calculated in a previous servo sector.

8. Computer readable recording medium storing an executable program implementing a reference clock frequency adjustment method comprising:

measuring each servo sector detection time interval by determining whether a servo address mark (SAM) is normally detected, and if the SAM is normally detected, calculating detection time interval information for a current servo sector by measuring a time interval between a previous SAM detection to the current SAM detection, but if the SAM is not normally detected, determining the detection time interval information for the current servo sector as reference time interval information between servo sectors;

generating an error signal by subtracting initially set reference time interval information between servo sectors from the measured servo sector detection time interval information; and adjusting the reference clock frequency using the error signal such that a constant number of reference clock pulses are generated in each servo sector detection time interval regardless of variation in each servo sector detection time interval.

9. A reference clock frequency adjustment apparatus comprising:

a counter measuring a servo sector detection time interval;

a servo sector detection period variation detector generating an error signal by subtracting initially set reference time interval information between servo sectors from the servo sector detection time interval information measured by the counter, wherein the servo sector detection period variation detector comprises:

a comparator comparing the servo sector detection time interval information with a first threshold, and outputting the initially set reference time interval information between servo sectors if the measured servo sector detection time interval information is greater than the first threshold, or outputting the measured servo sector detection time interval information if the measured servo sector detection time interval information is equal to or less than the first threshold;

a low pass filter removing noise from a signal indicating the servo sector detection time interval information output from the comparator; and a subtracter outputting an error signal obtained by subtracting the initially set reference time interval information between servo sectors from the servo sector detection time interval information output from the low pass filter;

a frequency correction amount determiner determining a frequency correction amount for the reference clock in accordance with the error signal; and a variable clock generator varying the reference clock frequency in accordance with the frequency correction amount such that a constant number of reference clock pulses are generated in each servo sector detection time interval regardless of variation in each servo sector detection time interval.

10. The reference clock frequency adjustment apparatus of claim 9, wherein the counter measures the servo sector detection time interval by counting the number of reference clock pulses generated during a time interval in which a servo address mark (SAM) is detected.

11. The reference clock frequency adjustment apparatus of claim 9, wherein the reference clock comprises a reference clock used for servo control.

12. The reference clock frequency adjustment apparatus of claim 9, wherein the reference clock comprises a reference clock used in a data read and write process.

13. The reference clock frequency adjustment apparatus of claim 9, wherein the frequency correction amount determiner adjusts the reference clock frequency using an error signal calculated in a current servo sector if an absolute value of the error signal is equal to or less than a second threshold or adjusts the reference clock frequency using an error signal calculated in a previous servo sector if the absolute value of the error signal is greater than the second threshold.

14. A disk drive comprising:

a disk storing information;

a read/write head reading data from and recording data to the disk; and a controller calculating a variation of a servo sector detection time interval from the disk and adjusting a reference clock frequency in accordance with the calculated servo sector detection time interval variation such that a constant number of reference clock pulses are generated in each servo sector detection time interval regardless of a variation of each servo sector detection time interval, wherein calculating the servo sector detection time interval variation comprises:

calculating detection time interval information for a current servo sector after measuring a time interval between a previous servo address mark (SAM) detection and a current SAM detection; and subtracting initially set reference time interval information between servo sectors from the calculated current servo sector detection time interval information, and if the SAM is not normally detected, the current servo sector detection time interval information is replaced by the initially set reference time interval information between servo sectors.

15. The disk drive of claim 14, wherein the reference clock comprises a reference clock used for servo control.

16. The disk drive of claim 14, wherein the reference clock comprises a reference clock used during read or write operation in the disk drive.

17. The disk drive of claim 14, wherein if the servo sector detection time interval variation is equal to or less than a second threshold, the reference clock frequency is adjusted in accordance with the servo sector detection time interval variation calculated using a current servo sector, and if the servo sector detection time interval variation is greater than the second threshold, the reference clock frequency is adjusted in accordance with a servo sector detection time interval variation calculated using a previous servo sector.

* * * * *